No. 643,259. Patented Feb. 13, 1900.
S. W. STOTT.
GAS BURNING APPARATUS.
(Application filed June 21, 1899.)
(No Model.)
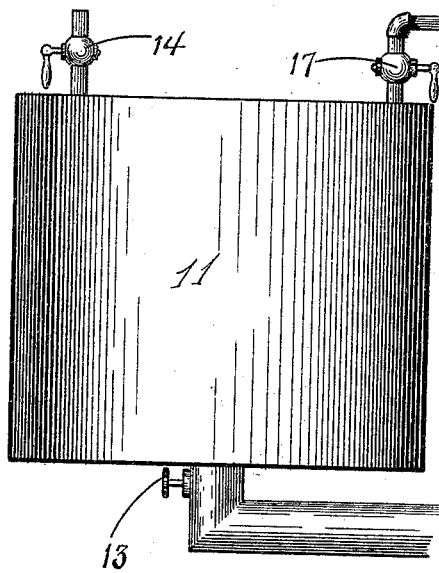
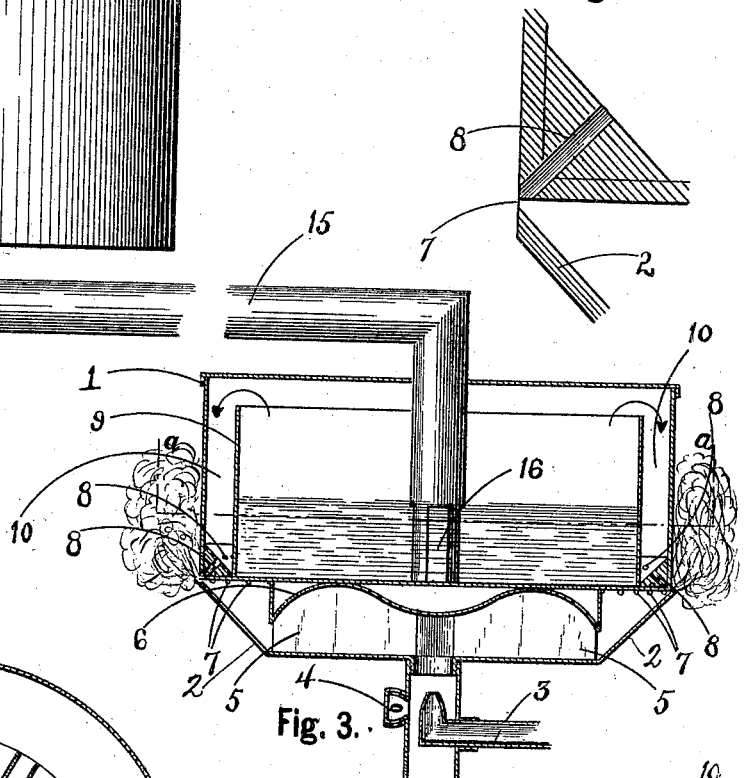
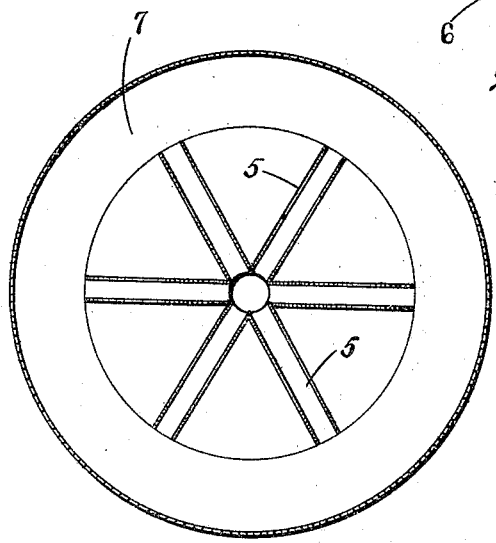
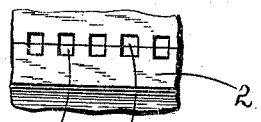
Fig. 1.
Fig. 4.
Fig. 2.
Fig. 3.
Fig. 5.
Witnesses.
Inventor,
Stephen W. Stott.
By A. P. Sangston
Attorney.
THE NORRIS PETERS CO., PHOTO-LITHO., WASHINGTON, D. C.

UNITED STATES PATENT OFFICE.

STEPHEN W. STOTT, OF BUFFALO, NEW YORK, ASSIGNOR TO HIMSELF AND PHILIP GERST, OF SAME PLACE.

GAS-BURNING APPARATUS.

SPECIFICATION forming part of Letters Patent No. 643,259, dated February 13, 1900.

Application filed June 21, 1899. Serial No. 721,288. (No model.)

*To all whom it may concern:*

Be it known that I, STEPHEN W. STOTT, a citizen of the United States, residing at Buffalo, in the county of Erie and State of New York, have invented certain new and useful Improvements in Gas-Burning Apparatus, of which the following is a specification.

My invention relates to an improved gas-burning apparatus in which a receptacle containing water is so arranged in proximity to the gas-flame as to be heated by the same and generate steam which jets upon the gas-flame, thus economizing the consumption of gas, increasing the heating capacity, and securing more perfect combustion.

For a full understanding of the merits and advantages of the invention reference is to be had to the accompanying drawings and the following description.

The invention is susceptible to various changes in the form, proportion, and minor details of construction without departing from the principle or sacrificing any of the advantages thereof, and to a full disclosure of the invention an adaptation thereof is shown in the accompanying drawings, in which—

Figure 1 represents a side elevation of my improved apparatus, partly in section. Fig. 2 represents a top plan view of the burner portion of my improved apparatus. Fig. 3 is a fragmentary section on or about line *a a*, Fig. 1, looking downward. Fig. 4 is an enlarged section through a portion of the water receptacle or vessel to illustrate the arrangement of the steam and gas orifices or jets. Fig. 5 is an enlarged view of a portion of the notched part of the burner device.

In referring to the drawings for the details of construction like numerals designate like parts.

My improved apparatus comprises a water receptacle or vessel mounted upon a burner device and an automatic feeding device for automatically replenishing the water when below a certain level.

The preferred form of apparatus is shown in the drawings, in which a cylindrical water receptacle or vessel 1 is mounted upon a burner device 2. The burner 2 has the usual gas-supply pipe 3 and air-mixer 4, which is provided with a series of vertical partitions or walls 5, which radiate from the center and serve to more thoroughly mix and mingle the gas and air. The top is also preferably provided with a curved partition 6 for the same purpose. The surrounding upper edge of the burner is notched to provide gas-orifices 7, substantially as shown in Fig. 5.

The water vessel or receptacle 1 is mounted upon the burner and has a series of diagonally downwardly and outwardly extending openings 8 in its bottom edge, which register with the notches and serve to direct the jets of steam upon the jets of gas-flame. The vessel 1 is provided with an internal circular partition 9, arranged concentric with the outer circular wall thereof, within which the water is held, the space between the exterior of this partition 9 and the interior of the wall of the vessel serving as a chamber 10 for the superheated steam generated from the water, the steam-jet openings 8 extending from the bottom of said chamber.

The automatic feeding device comprises a tank 11, supported at a higher elevation than the vessel or receptacle 1 and having a water-supply pipe 12, provided with a shut-off cock 13 and an air-valve 14. A water-conducting pipe 15 extends from this tank into the vessel 1 and has its lower end provided with slots or openings 16. A shut-off cock 17 is also attached to the water-conducting pipe.

The burner 2 and vessel 1 are preferably formed of cast-iron; but any other suitable material may be used. The tank and water-conducting pipe are preferably sheet-iron.

The operation of this improved apparatus is as follows: The gas being ignited, the water in the vessel 1 is heated and the steam generated jets through the openings 8 upon the gas-flame, mixing and mingling with the same. When the level of the water in the vessel during the generation of steam lowers sufficiently to expose the openings or slots 16 in the lower end of the water-conducting pipe, a quantity of the steam within the vessel 1 flows up into said pipe and permits a like quantity of water to descend and again raise the level of the water above the openings or slots 16. The tank 11 when empty is filled by shutting off the cock 17 in the water-conducting pipe and opening the cock 13 and air-valve 14 to permit the water to flow in. When sufficiently filled, the cock 13 and valve 14 are shut off and the cock 17 reopened.

My improved apparatus can be employed in any of the ordinary forms of gas-burning stoves as a heating medium or can be mounted upon a skeleton frame similar to those used in connection with gasolene or oil stoves.

I claim as my invention—

1. An improved apparatus for burning gas, comprising a burner having a gas orifice or orifices and a water vessel mounted upon said burner and adapted to be heated by the flame thereof to generate steam, and having a steam-chamber provided with an opening or openings through which the steam passes to mingle with the gas as it issues from the orifice or orifices and means for maintaining the water in said vessel at substantially the same level.

2. An improved apparatus for burning gas, comprising a circular burner having a plurality of gas-orifices and a circular water vessel mounted upon said burner and having a circular interior partition concentric with the circular side wall thereof and forming a water-tank, the space between the circular partition and the side wall forming an annular steam-chamber, said water vessel having a series of openings at the bottom of said steam-chamber that register with the gas-orifices in the burner and serve as passages to conduct and mingle the steam with the gas as it issues from the gas-orifices, as set forth.

3. An apparatus for burning gas, comprising a circular burner device connected to a gas-pipe at its center and having a series of gas-conducting passages radiating from said center, and a series of notches in its surrounding top edge forming gas-orifices, a circular water vessel mounted upon said burner and having a circular interior partition concentric with the circular side wall thereof and forming a water-tank, the space between the circular partition and the side wall forming an annular steam-chamber, said water vessel having a series of openings at the bottom of said steam-chamber that register with the gas-orifices in the burner and serve as passages to conduct and mingle the steam with the gas as it issues from the gas-orifices, as set forth.

4. An improved apparatus for burning gas, comprising a circular burner device connected to a gas-pipe at its center and having a series of gas-conducting passages radiating from said center, a curved top over said passages, and a series of notches in its surrounding top edge forming gas-orifices, a circular water vessel mounted upon said burner and having a circular interior partition concentric with the circular side wall thereof and forming a water-tank, the space between the circular partition and the side wall forming an annular steam-chamber, said water vessel having a series of openings at the bottom of said steam-chamber that register with the gas-orifices in the burner and serve as passages to conduct and mingle the steam with the gas as it issues from the gas-orifices, as set forth.

5. An improved apparatus for burning gas, comprising a burner having gas-orifices and a water vessel mounted upon said burner and having a partition forming a water-tank, the space between the partition and the wall of the water vesssel forming a steam-chamber; said water vessel having a series of openings at the bottom of said steam-chamber which serve as passages to conduct and mingle the steam with the gas as it issues from the gas-orifices, as set forth.

6. An apparatus for burning gas, comprising a burner device connected to a gas-pipe and having a series of gas-radiating conducting-passages, and a series of notches in its surrounding top edge forming gas-orifices, a water vessel mounted upon said burner and having a curved partition forming the side walls of a water-tank, the space between the partition and the side of the water vessel forming a steam-chamber, said water vessel having a series of openings at the bottom of said steam-chamber which serve as passages to conduct and mingle the steam with the gas as it issues from the gas-orifices, as set forth.

7. An improved apparatus for burning gas, comprising a burner device connected to a gas-pipe and having a series of gas-conducting passages, a top over said passages, and a series of notches in its surrounding top edge forming gas-orifices, a water vessel mounted upon said burner and having an interior partition forming a water-tank, the space between the partition and the side wall forming a steam-chamber, said water vessel having a series of openings at the bottom of said steam-chamber that register with the gas-orifices in the burner and serve as passages to conduct and mingle the steam with the gas as it issues from the gas-orifices, as set forth.

8. An improved apparatus for burning gas, comprising a burner having a gas orifice or orifices and a water vessel mounted upon said burner and adapted to be heated by the flame thereof to generate steam and having a steam-chamber provided with an opening or openings through which the steam passes to mingle with the gas as it issues from the orifice or orifices.

9. An improved apparatus for burning gas, comprising a burner having a gas orifice or orifices, a water vessel mounted in proximity to said burner and adapted to be heated by the flame thereof to generate steam, and divided by a partition into a water-tank and a steam-chamber having an opening or openings through which the steam passes to mingle with the gas as it issues from the orifice or orifices and means for maintaining the water at substantially the same level in said water vessel during the burning of the gas.

10. An improved apparatus for burning gas, comprising a burner having a gas orifice or orifices, a water vessel mounted in proximity to said burner and adapted to be heated by the flame thereof to generate steam and divided by an interior partition into an inner water-tank and an outer steam-chamber having an opening or openings through which the steam passes to mingle with the gas as it issues from the orifice or orifices and means for maintaining the water at substantially the same level in said water vessel during the burning of the gas.

11. An improved apparatus for burning gas, in which steam is generated and mingles with the flame by the heat thereof, comprising a water vessel having a water-tank and a steam-chamber provided with openings, a gas-burning device arranged in proximity to said water vessel and adapted to heat the water in said vessel, to generate steam which passes through the openings to mingle with the gas as it issues from the gas-burning device.

12. An improved apparatus for burning gas, comprising a burner having gas-orifices, a water vessel mounted upon said burner and having a partition forming an interior water-tank, the space between the partition and the side wall forming a steam-chamber, said water vessel having a series of openings at the bottom of said steam-chamber which serve as passages to conduct and mingle the steam with the gas as it issues from the gas-orifices, and means for maintaining substantially the same level of water in the water vessel.

STEPHEN W. STOTT.

Witnesses:
A. J. SANGSTER,
L. M. BILLINGS.